United States Patent Office 3,268,062
Patented August 23, 1966

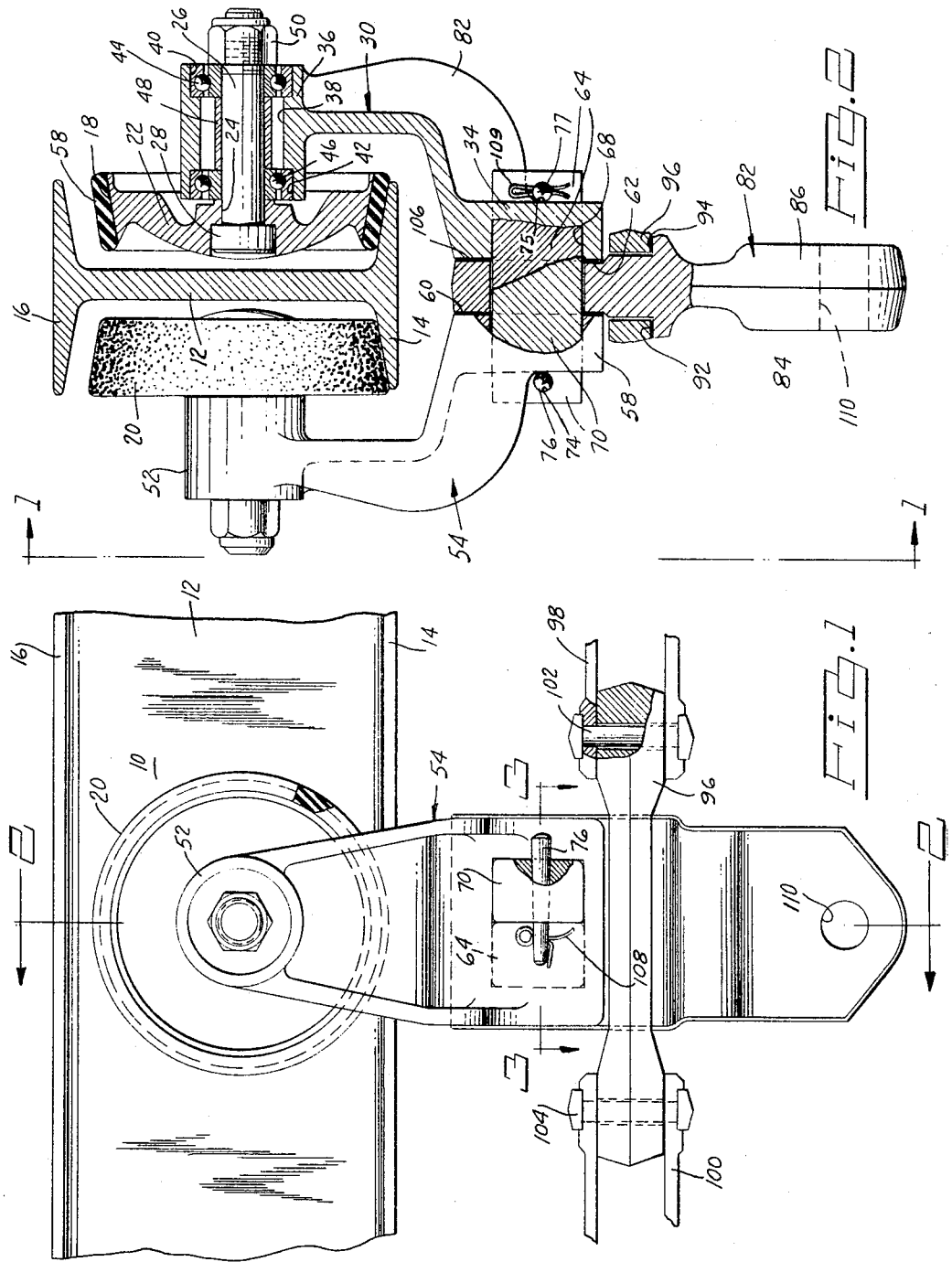

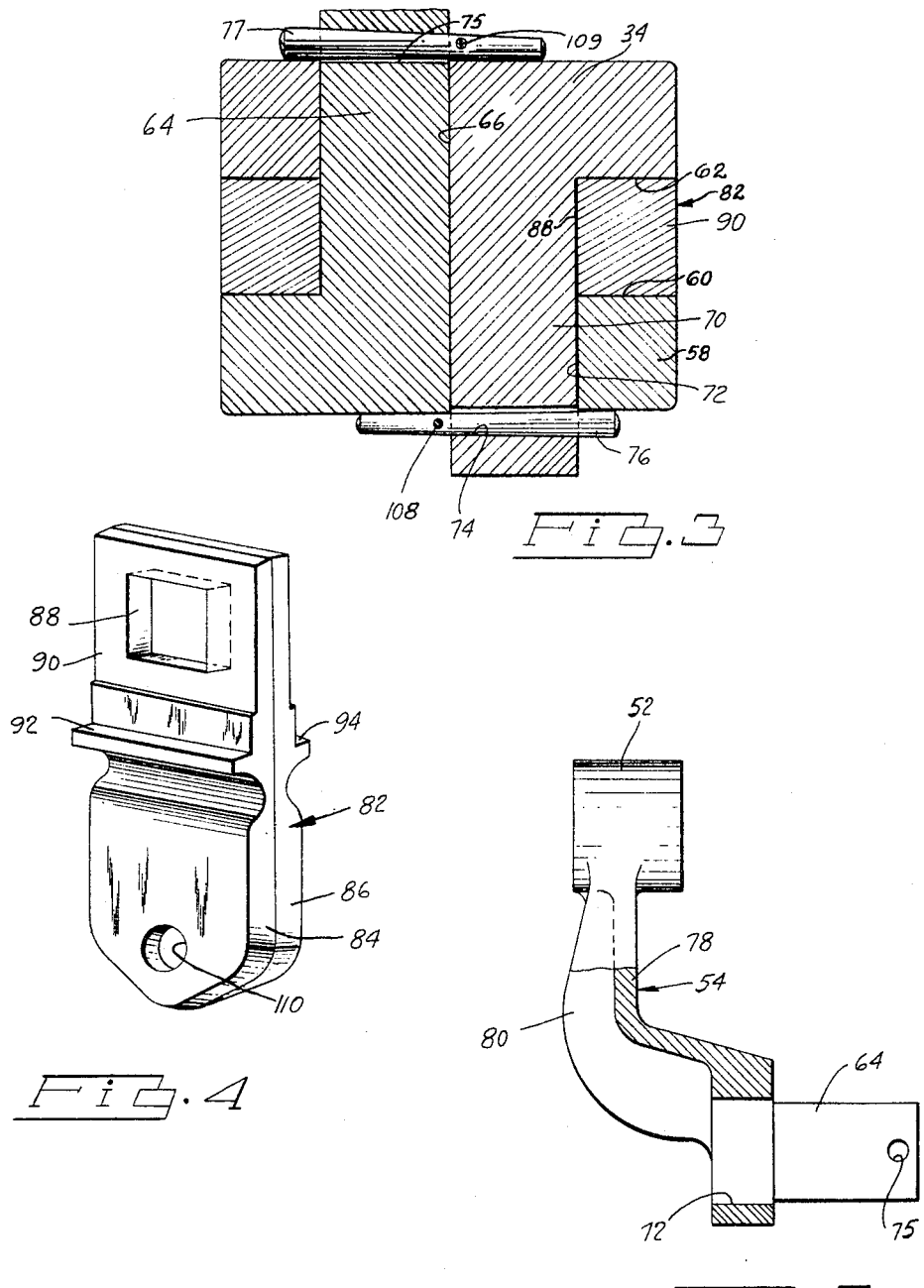

3,268,062
OVERHEAD CONVEYER TROLLEY
Ben Gladstone, 12745 Elgin, Huntington Woods, Mich.
Filed Oct. 7, 1964, Ser. No. 402,265
6 Claims. (Cl. 198—177)

My invention relates generally to overhead conveyer mechanisms, and more particularly to a trolley construction having a bipartite yoke that is adapted to support and rotatably journal tandem trolley wheels for engaging an overhead track.

It is known in this art to employ a trolley yoke construction that is capable of rotatably supporting a pair of trolley wheels for engaging flanges on either side of a horizontally situated overhead I-beam. One such construction is shown in prior art Patent No. Re. 23,658 which issued May 19, 1953, to Mr. Eugene Gaboury.

The Gaboury device comprises a bipartite yoke having hanger arms that form bearing supports for a pair of juxtaposed trolley wheels. The wheels are adapted to engage the inner flange surfaces of an I-beam as a load is supported by a depending carrier member to which may be connected a load lifting winch or other types of materials handling devices. The hanger arms include bases having juxtaposed mounting faces situated on either side of the carrier member. The carrier member is formed with a rectangular opening at a location intermediate the mounting faces. Each face has protruding therefrom a so-called keeper member in the form of a rectangular boss. The keeper members on the respective arms are not situated in alignment, but instead are displaced relative to each other so that they may be received with the common opening formed in the carrier member. The keeper members are centrally apertured to permit a key to be received therethrough. Cooperating grooves formed in the carrier member are disposed in registry with the apertures in the keeper members when the hanger arms are assembled in place.

When the keeper members of such prior art constructions are inserted in place, the load upon the carrier member produces a cantilever load that in turn is distributed to the carrier arms and hence to the trolley wheels. The maximum load that can be accommodated by the hanger arms and the keeper members thus is restricted by the beam strength of the keeper members themselves.

I am aware also of another more recently designed trolley wheel construction having features that are similar to the Gaboury arrangement but wherein an attempt is made to avoid the beam loads acting on the keeper members. This construction, like the 1953 Gaboury construction, includes a pair of hanger arms having juxtaposed mounting surfaces on which are formed keeper members of rectangular cross section. These are offset transversely with respect to the axis of the wheels and are received in side-by-side relationship within a common opening formed in the load supporting carrier member. Unlike the 1953 Gaboury construction, however, this more recent construction includes a separate recess formed in each juxtaposed mounting face for receiving the end of the keeper member for the companion hanger member. In this fashion, an additional end support is provided by the carrier members. Thus the load carrying capacity of the trolley construction is increased accordingly. In this later arrangement, a key aperture is formed in each keeper member and these apertures are situated in registry with aligned grooves formed in the load supporting carrier member to permit a locking pin to be received therethrough.

Although this more recent construction is an improvement over the earlier device, experience has shown that it also has design shortcomings that limit the load carrying capacity. The key connection between the hanger arms and the load supporting carrier member, of necessity, will permit relative displacement between the hanger arms about an axis that is transverse to the axis of the wheels. Thus, the so-called recesses that normally would provide end support for the keeper members are permitted to move away from the cooperating keeper members thereby providing an undesirable cantilever load. As in the early 1953 construction, the load carrying capacity of the trolley is reduced as this relative displacement occurs. In addition, the keyed connection between the hanger arms and the load supporting carrier member, of necessity, requires key openings formed in each of the keeper members themselves. This reduces the load supporting area over which the stress due to the load can be distributed and the keeper members tend to deflect and fail under heavy loads.

Each of the trolley constructions described in the foregoing paragraphs presents a difficult and expensive machining operation during manufacture. This is due in part to the requirement for key slots and aligned, tapered apertures formed in the keeper members. It also is necessary in such an arrangement to provide sufficient clearance to permit easy assembly and to avoid interference fits on each of the three principal load carrying elements of the mechanism. The requirement for adequate clearance contributes to the tendency of the hanger arms to become displaced relative to each other after they are assembled as heavy loads are applied to the carrier member.

It is an object of my invention to provide an overhead trolley construction that would eliminate the shortcomings inherent in such known constructions.

It is a further object of my invention to provide a trolley construction capable of journalling rotatably a pair of juxtaposed trolley wheels wherein provision is made for readily assembling and disassembling the wheel supporting elements of the structure.

It is a further object of my invention to provide a trolley wheel construction for overhead conveyors having a pair of track engaging trolley wheels on either side of a structural flange extending vertically between the wheels and wherein provision is made for locking the wheel hanger arms together so that they will remain fast and relatively immovable regardless of any manufacturing tolerances that may exist and regardless of whether heavy loads are applied to the assembly.

In carrying forth the foregoing object, I have provided a trolley wheel construction for an overhead conveyor that comprises a pair of hanger arms, each arm rotatably supporting a trolley wheel and having a base formed with surfaces that carry solid keeper members. Each keeper member is adapted to be received within an opening formed in a cooperating carrier member. One hanger face is formed with an opening to receive a first keeper member of the companion hanger arm and provide a suitable end support. The companion hanger arm is formed with another opening that receives a second keeper member for the first hanger arm, each keeper member being long enough to extend through the opening with which it registers. A key or pin aperture is formed in the extended ends of the keeper members which protrude from the opposite side of the base of the associated hanger arm. As the pin apertures receive locking pins, the hanger arms will be locked together with no opportunity for relative displacement to take place therebetween regardless of the manufacturing clearances or tolerances that may exist.

It is a further object of my invention to provide a trolley wheel construction for overhead conveyors wherein the principal structural components are formed of aluminum castings and wherein the solid keepers, which are formed integrally with the arms, present a maximum cross sectional area over which the stresses due to the load may be distributed. I contemplate that the relatively light weight of the assembly will facilitate handling.

It is a further object of my invention to provide a trolley wheel construction as above set forth wherein each of the principal structural components may be cast or forged and wherein a minimum amount of finish machining is required. These characteristics and other manufacturing economies thereby make it possible to provide an inexpensive, light weight trolley wheel construction that may be manufactured in quantity with reasonable cost.

It is a further object of my invention to provide a trolley wheel construction of the type above set forth wherein provision is made for eliminating wear of the wheels as they engage the wheel supporting track surfaces. I contemplate that this may be done by forming each wheel with a non-metallic rim that is capable of both accommodating readily shock loads and increasing the operating life of the trolley construction by reducing wear to a minimum. In a preferred embodiment of my invention, the wheel rims may be in the form of a synthetic rubber tire made of materials presently commercially available. One such material, a urethane synthetic rubber, is manufactured under the trademark "Adiprene."

Further objects and features of my invention will become apparent from the following description and from the accompanying drawings wherein:

FIG. 1 shows a side elevation view, partly in section, of my improved trolley wheel construction. The view of FIG. 1 is taken along the plane of section 1—1 of FIG. 2.

FIG. 2 shows a transverse cross sectional view taken along the plane of section line 2—2 of FIG. 1.

FIG. 3 is a cross sectional view of the structure of FIGS. 1 and 2, taken along the plane of section line 3—3 of FIG. 1.

FIG. 4 is an isometric view of the load carrier member of the structures of FIGS. 1 and 2.

FIG. 5 is a detail view, partly in section, showing one hanger arm of the construction of FIGS. 1 and 2.

Referring first to FIGS. 1 and 2, numeral 10 designates generally a load supporting conveyor track in the form of an I-beam. It includes a vertical flange 12 and upper and lower flanges 14 and 16 respectively. These flanges can best be seen by referring to FIG. 2.

A first trolley wheel 18 is situated on the right hand side of the flange 12 as indicated in FIG. 2. A cooperating trolley wheel 20 is situated on the other side of the flange 12 in juxtaposed relationship with respect to the wheel 18. Both wheels 18 and 20 engage the inner track surface of the flange 14 for the track 10.

The wheel 18, like wheel 20, is formed of solid construction. It includes a hub 22 having a central aperture 24 which receives an axle pin 26. A shoulder formed in the hub 22 engages the pin head 28 to prevent shifting movement between the pin 26 and the wheel 18.

A first wheel supporting hanger arm is shown at 30. It includes a portion that is offset in the direction of the axis of the wheel 18, as shown at 32. It includes also a base 34 that is situated relatively close to the plane of the flange 12. Portion 32 of the hanger arm 30 has a terminal bearing boss 36 which has formed therein an opening 38 through which the pin 26 extends. Opening 38 is formed with enlarged diameter bearing recesses 40 and 42 which are situated at either axial end of the opening 38. Recess 40 receives a suitable wheel bearing 44 and a corresponding bearing 46 is situated within the recess 42. The bearings 44 and 46 may be in the form of ball bearings with the inner races thereof surrounding the pin 26. A spacer sleeve 48 is situated between the inner races of the bearings 44 and 46.

The extended end of the pin 26 is threaded to accommodate a locking nut 50 which retains wheel 18 in assembled relationship with respect to the hanger arm 30.

Wheel 20 is constructed so that it will be identical to the wheel 18. It is mounted upon a boss 52 carried at the terminal end of a hanger arm 54. Hanger arm 30 and hanger arm 54 may be formed of similar shape and construction.

Wheel 18 is provided with a track engaging periphery that receives a tire 56 formed of suitable synthetic rubber material that resists wear and that will absorb shock loads. During manufacture it is forced on the periphery of wheel 18 and held in place after assembly by any suitable technique. The periphery of wheel 18 and the tire 56 itself can be formed with a generally conical shape to conform to the taper that is usually present on flanges for commercially available I-beams such as that which is used as track 10.

Hanger arm 54, like hanger arm 30, includes a base 58. It is formed with a vertical surface 60 which is situated in a juxtaposed relationship with respect to a vertical surface 62 formed on base 34. Hanger arms 54 and 30 may be constructed by forging or casting. Hub 58 can be formed with a solid keeper member 64, which is best seen in FIG. 1. Keeper 64, which is of rectangular cross section, extends through the base 34 of the hanger arm 30, the latter being formed with a rectangular opening 66 which receives its end. Opening 66 defines a load supporting shoulder 68 which may be engaged by the extended end of the keeper member 64 thereby providing an end support.

FIG. 3 illustrates in more particular detail the relationship of the base 34 for the hanger arm 30 and the end of the keeper member 64.

As best seen in FIGS. 1 and 3, hanger arm 30 is provided with a keeper member 70. Like the keeper member 64, the keeper member 70 is made integrally with the hub 34. It is of sufficient length to be received through an opening 72 formed in the base 58 of the hanger arm 54.

As best seen in FIG. 1, the keeper member 70 is formed with a rectangular cross section and opening 72 has a cross section that corresponds in shape with the cross section of keeper member 70.

The portion of keeper member 70 that extends outwardly from the opening 72 is provided with a tapered pin aperture 74. This aperture is formed as seen in FIG. 2, substantially on the geometric axis of the keeper member 70. It receives a tapered locking pin 76, the ends of which engage spaced portions on the outer surface of the hub 58 on opposite sides of the aperture 74. A corresponding aperture 75 and pin 77 are provided for keeper member 64.

The hanger arm 54 is best seen in FIG. 5. It includes a main offset portion 78 which corresponds to the offset portion 32 of the hanger arm 30. It includes also a structural supporting web 80 which is designed to eliminate flexure under load. A corresponding structural web 82 is provided for the hanger arm 30.

As best seen in FIG. 4, there is provided a local supporting carrier member 82 which includes a pair of juxtaposed and geometrically similar plates separately identified by reference characters 84 and 86. These plates are made so that they are joined together as indicated to form a unitary assembly.

The upper portion of the carrier member 82 includes the rectangular opening 88. Plate 84 includes a relatively smooth surface 90 which is adapted to engage the base surface 60 of the hanger arm 54. Plate 84 is formed also with a shoulder 92 and a corresponding shoulder 94 is formed on the plate 86. The shoulders 92 and 94 are adapted to support a conveyer chain link 96 which is apertured to receive the carrier member 82. As indicated in FIG. 1, conveyer chain links 98 and 100 are pinned to the ends of the link 96, suitable pin connections being provided for this purpose as shown at 102 and 104. The trolley construction can be shifted along the track 10 by appropriately controlling the motion of the chain of which the link 96 forms a part.

When the carrier member 82 is assembled in place, it is positioned between the surfaces 60 and 62 of the bases 58 and 34, respectively. The surface 62 is adapted to engage a flat surface 106 formed on plate 86. The surface 106 corresponds to a surface 90 on plate 84.

It will be apparent from the foregoing description that when the pins 76 and 77 are assembled in place and held axially fast by the cotter keys 108 and 109, each keeper member 70 and 64 will be end supported by reason of the supporting action of the companion hanger arm. The end of keeper member 64 will be supported upon shoulder 68 formed by the base of opening 66 and the end of keeper member 70 will be supported upon the base of the opening 72. There is no opportunity for relative adjustment to take place between the hanger arms after they are assembled. The keeper members will be interlocked and held fast and they will be capable of accommodating an increased load on the carrier member 82.

No special skill or special tools are required to assemble or disassemble the structural elements of the trolley wheel construction. There is no high stress concentration produced because of the wedging action of the pin 76. In contrast with trolley wheel constructions of known design, the force that is produced by the wedging action of the locking pin described in the preamble portion of this specification is prone to produce cracking of the keeper members. There is no opportunity for this type of failure to occur, however, in my improved construction.

The inability of the structural elements of my invention to shift or to adjust relative to each other as heavy loads are applied to the carrier member 82 eliminates the possibility that the end supports for the keeper members will slip off or become disengaged from the bases of the companion interlocked hanger arms.

The depending portions of the plates 84 and 86 of the carrier member 82 can be apertured, as indicated at 110, to permit the attachment thereto of a winch or other load carrying devices of various types.

A trolley wheel made from aluminum having a tire made from the aforedescribed rubber provides a trolley wheel structure which has inherent qualities and characteristics not embodied in the prior art trolley wheels. For example, a trolley wheel made from aluminum and with a rubber tire as described herein is light in weight as compared to the prior art trolley wheels. The rubber tire will withstand a high temperature before it disintegrates, and it is about four times as strong as iron. It will outlast iron and it is abrasive proof. This synthetic rubber has a further novel feature in that a trolley wheel having a tire made from this rubber will eliminate wear on the conveyer supporting channels. This rubber also well eliminate slippage on the channels, and it is impervious to oil and water.

Having thus described a preferred embodiment of my invention, what I claim and desire to secure by U.S. Letters Patent is:

1. A trolley wheel construction for an overhead conveyer, comprising: a pair of trolley wheels, said trolley wheels being adapted to engage horizontal surfaces of an overhead track, a pair of hanger arms situated on each side of said track and including portions that are offset in the direction of the axis of said wheels, said hanger arms including also juxtaposed base portions that are situated relatively close together, means for rotatably journalling one of said trolley wheels on an upward terminal portion of each hanger arm, each base portion including a mounting surface, a carrier member depending from said base portions and situated in engaged relationship with said mounting surfaces, said carrier member having formed therein only one aperture, a keeper member formed on each base portion and extending outwardly from its associated mounting surface through the aperture in the carrier member, the keeper member for one hanger arm being disposed out of alignment with respect to the keeper member for the companion hanger arm, the base portion for one hanger arm being apertured to receive the outer end of the keeper member for the other hanger arm and the base portion for said other hanger arm being apertured to receive the outer end of the keeper member for said one hanger arm whereby said keeper members are end supported, and means bearing against only one keeper and only one of said hanger arms for securing the keeper members against displacement.

2. A trolley wheel construction for an overhead conveyer, comprising: a pair of juxtaposed trolley wheels having a common axis, said trolley wheels being adapted to engage horizontal surfaces of an overhead track that comprises a supporting flange extending vertically between said wheels, a pair of hanger arms, each arm comprising a portion that is offset in the direction of the common axis of said wheels and a base portion situated relatively close to the plane of the flange of said track, means for rotatably journaling said wheels on said offset portions of said hanger arms, a carrier member including a first portion having only one aperture formed therethrough situated between the base portions of said hanger arms, said base portions including parallel flat surfaces, said first portion of said carrier member being formed with cooperating flat surfaces that engage the surfaces of said base portions after assembly, a first keeper member of solid cross section formed on one base portion and extending through said aperture in the carrier member in the direction of the axis of said wheels, a second keeper member of solid cross section formed on the other base portion and extending through said aperture in the carrier member adjacent said first keeper member, an aperture formed in each base portion being adapted to receive the outer end of the keeper member on the adjacent base portion, and a releasable means for connecting said keeper members to said base portions and operatively bearing against only one of said hanger arms and keeper members.

3. A trolley wheel construction for an overhead conveyer, comprising: a pair of trolley wheels, said trolley wheels being adapted to engage horizontal surfaces of an overhead track, a pair of hanger arms situated on each side of said track and including portions that are offset in the direction of the axis of said wheels, said hanger arms including also juxtaposed base portions that are situated relatively close together, means for rotatably journalling one of said trolley wheels on an upward terminal portion of each hanger arm, each base portion including a mounting surface, a carrier member depending from said base portions and situated in engaged relationship with said mounting surfaces, said carrier member having formed therein only one aperture, a keeper member formed on each base portion and extending outwardly from its associated mounting surface through the aperture in the carrier member, the keeper member for one hanger arm being disposed out of alignment with respect to the keeper member for the companion hanger arm, the base portion for one hanger arm being apertured to receive the outer end of the keeper member for the other hanger arm and the base portion for said other hanger arm being apertured to receive the outer end of the keeper member for said one hanger arm whereby said keeper members are end supported, means bearing against only one keeper and only one of said hanger arms for securing the keeper members against displacement, and a non-metallic rubber-like tire surrounding the periphery of each wheel and engageable with said horizontal surfaces thereby eliminating wear.

4. A trolley wheel construction for an overhead conveyer, comprising: a pair of juxtaposed trolley wheels having a common axis, said trolley wheels being adapted to engage horizontal surfaces of an overhead track that comprises a supporting flange extending vertically between said wheels, a pair of hanger arms, each arm comprising a portion that is offset in the direction of the common axis of said wheels and a base portion situated relatively close to the plane of the flange of said track, means for rotatably journaling said wheels on said offset portions of said hanger arms, a carrier member including a first portion having only one aperture formed therethrough situated between the base portions of said hanger arms, said base portions including parallel flat surfaces, said first portion of said carrier member being formed with cooperating flat surfaces that engage the surfaces of said base portions after assembly, a first keeper member of solid cross section formed on one base portion and extending through said aperture in the carrier member in the direction of the axis of said wheels, a second keeper member of solid cross section formed on the other base portion and extending through said aperture in the carrier member adjacent said first keeper member, an aperture formed in each base portion being adapted to receive the outer end of the keeper member on the adjacent base portion, a releasable means for connecting said keeper members to said base portions and operatively bearing against only one of said hanger arms and keeper members, and a non-metallic rubber-like tire surrounding the periphery of each wheel and engageable with said horizontal surfaces thereby eliminating wear.

5. A trolley wheel construction for an overhead conveyer, comprising: a pair of trolley wheels, said trolley wheels being adapted to engage horizontal surfaces of an overhead track, a pair of hanger arms situated on each side of said track and including portions that are offset in the direction of the axis of said wheels, said hanger arms including also juxtaposed base portions that are situated relatively close together, means for rotatably journalling one of said trolley wheels on an upward terminal portion of each hanger arm, each base portion including a mounting surface, a carrier member depending from said base portions and situated in engaged relationship with said mounting surfaces, said carrier member having formed therein only one aperture, a keeper member formed on each base portion and extending outwardly from its associated mounting surface through the aperture in the carrier member, the keeper member for one hanger arm being disposed out of alignment with respect to the keeper member for the companion hanger arm, the base portion for one hanger arm being apertured to receive the outer end of the keeper member for the other hanger arm and the base portion for said other hanger arm being apertured to receive the outer end of the keeper member for said one hanger arm whereby said keeper members are end supported, means bearing against only one keeper and only one of said hanger arms for securing the keeper members against displacement, said carrier member including a depending portion, said depending portion being adapted to carry load handling devices, and a chain link portion removably secured to said dependent portion to permit connection therewith of a conveyer chain.

6. A trolley wheel construction for an overhead conveyer, comprising: a pair of juxtaposed trolley wheels having a common axis, said trolley wheels being adapted to engage horizontal surfaces of an overhead track that comprises a supporting flange extending vertically between said wheels, a pair of hanger arms, each arm comprising a portion that is offset in the direction of the common axis of said wheels and a base portion situated relatively close to the plane of the flange of said track, means for rotatably journaling said wheels on said offset portions of said hanger arms, a carrier member including a first portion having only one aperture formed therethrough situated between the base portions of said hanger arms, said base portions including parallel flat surfaces, said first portion of said carrier member being formed with cooperating flat surfaces that engage the surfaces of said base portions after assembly, a first keeper member of solid cross section formed on one base portion and extending through said aperture in the carrier member in the direction of the axis of said wheels, a second keeper member of solid cross section formed on the other base portion and extending through said aperture in the carrier member adjacent said first keeper member, an aperture formed in each base portion being adapted to receive the outer end of the keeper member on the adjacent base portion, a releasable means for connecting said keeper members to said base portions and operatively bearing against only one of said hanger arms and keeper members, said carrier member including a depending portion, said depending portion being adapted to carry load handling devices, and a chain link portion removably secured to said dependent portion to permit connection therewith of a conveyer chain.

References Cited by the Examiner
UNITED STATES PATENTS

| 1,962,531 | 6/1934 | Shafer | 198—177 |
| 2,517,652 | 8/1950 | Gaboury | 198—177 |

ANDRES H. NIELSEN, *Primary Examiner.*

EVON C. BLUNK, *Examiner.*

R. E. KRISHER, E. A. SROKA, *Assistant Examiners.*